United States Patent
Kuwabara et al.

(10) Patent No.: US 12,401,307 B2
(45) Date of Patent: Aug. 26, 2025

(54) MOTOR DRIVE DEVICE

(71) Applicant: Mitsubishi Electric Corporation, Tokyo (JP)

(72) Inventors: Yasushi Kuwabara, Tokyo (JP); Takamasa Onishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 549 days.

(21) Appl. No.: 17/419,790

(22) PCT Filed: Mar. 28, 2019

(86) PCT No.: PCT/JP2019/013891
§ 371 (c)(1),
(2) Date: Jun. 30, 2021

(87) PCT Pub. No.: WO2020/194755
PCT Pub. Date: Oct. 1, 2020

(65) Prior Publication Data
US 2022/0123683 A1    Apr. 21, 2022

(51) Int. Cl.
*H02P 1/44* (2006.01)
*H02H 5/04* (2006.01)
(Continued)

(52) U.S. Cl.
CPC .............. *H02P 27/06* (2013.01); *H02H 5/047* (2013.01); *H02H 7/08* (2013.01); *H02P 29/64* (2016.02)

(58) Field of Classification Search
CPC ....................................................... H02P 6/24
See application file for complete search history.

(56) References Cited

U.S. PATENT DOCUMENTS 10,199,982 B2    2/2019    Endoh
10,840,845 B2   11/2020    Sato et al.
(Continued)

FOREIGN PATENT DOCUMENTS

JP    H01-113598 U    7/1989
JP    H06-347143 A   12/1994
(Continued)

OTHER PUBLICATIONS

Office Action dated Mar. 1, 2022, issued in a corresponding Japanese patent application No. 2021-508672 with a full English machine translation.
(Continued)

*Primary Examiner* — Kawing Chan
*Assistant Examiner* — Charles S Laughlin
(74) *Attorney, Agent, or Firm* — Posz Law Group, PLC

(57) ABSTRACT

A motor drive device includes an inverter circuit to drive a motor, an inverter control device to control the inverter circuit, a gate-driving power supply to supply power to be used for driving the inverter circuit, a circuit pattern configured to connect the inverter circuit and the gate-driving power supply, a control power supply connected to the circuit pattern to supply power to be used for driving the inverter control device, and a thermal switch connected to the circuit pattern to interrupt power supply from the gate-driving power supply to the inverter circuit when a temperature of a winding of the motor exceeds a predetermined temperature.

2 Claims, 3 Drawing Sheets

(51) Int. Cl.
*H02H 7/08* (2006.01)
*H02P 21/22* (2016.01)
*H02P 27/06* (2006.01)
*H02P 29/64* (2016.01)

(56) References Cited

U.S. PATENT DOCUMENTS

| | | | |
|---|---|---|---|
| 2010/0253268 A1 | 10/2010 | Marvelly | |
| 2010/0315024 A1 | 12/2010 | Najima et al. | |
| 2015/0084570 A1* | 3/2015 | Hara | B62D 5/0484 |
| | | | 318/494 |
| 2016/0164384 A1* | 6/2016 | Johnson | F16C 19/30 |
| | | | 310/85 |
| 2018/0167019 A1 | 6/2018 | Endoh | |
| 2018/0262149 A1 | 9/2018 | Uchida | |
| 2020/0036315 A1 | 1/2020 | Sato et al. | |
| 2020/0220479 A1* | 7/2020 | Miyazaki | H02M 7/53875 |

FOREIGN PATENT DOCUMENTS

| | | |
|---|---|---|
| JP | H08-061287 A | 3/1996 |
| JP | 2004-297901 A | 10/2004 |
| JP | 2005-143210 A | 6/2005 |
| JP | 2010-246374 A | 10/2010 |
| JP | 2012-228009 A | 11/2012 |
| JP | 2015-223018 A | 12/2015 |
| JP | 2018-098876 A | 6/2018 |
| WO | 2018/173457 A1 | 9/2018 |

OTHER PUBLICATIONS

Japanese Office Action mailed Aug. 30, 2022 issued in corresponding Japanese Application No. 2021-508672 (and English machine translation).
International Search Report of the International Searching Authority mailed Jun. 11, 2019 for the corresponding International application No. PCT/JP2019/013891.
Australian Office Action dated Jun. 23, 2022 issued in corresponding AU Application No. 2019437996.
Office Action mailed Dec. 13, 2022 in corresponding Turkish Patent Application No. 2021/012851 (with English translation).
Office Action dated Jul. 20, 2023 issued in corresponding CN Patent Application No. 201980093733.5 (and English Translation).
Chinese Office Action mailed Feb. 8, 2024 in corresponding Chinese Application No. 201980093733.5 (and English machine translation).
Office Action dated Jun. 18, 2024 issued for the corresponding German Patent Application No. 112019007096.7 (and English translation).
Office Action dated Jul. 30, 2024 issued for the corresponding Turkish Patent Application No. 2021/012851 (and English translation).

* cited by examiner

MOTOR DRIVE DEVICE

CROSS REFERENCE TO RELATED APPLICATION

This application is a U.S. national stage application of PCT/JP2019/013891 filed on Mar. 28, 2019, the contents of which are incorporated herein by reference.

FIELD

The present invention relates to a motor drive device that drives a motor.

BACKGROUND

In order to protect a motor of a motor drive device, a technique has been conventionally proposed in which when an overcurrent detection circuit detects an overcurrent flowing through an inverter circuit that drives a motor, an inverter control device stops supply of a gate drive output to the inverter circuit. The gate drive output is intended to control the inverter circuit.

Another technique has been proposed in which an irregular increase in temperature of the winding of a motor caused by an overcurrent is detected by a thermal switch, and on the basis of a signal indicating that the thermal switch has been activated, an inverter control device stops supply of a gate drive output to an inverter circuit (see, for example, Patent Literature 1).

CITATION LIST

Patent Literature

Patent Literature 1: Japanese Patent Application Laid-open No. H8-61287

SUMMARY

Technical Problem

In the conventional techniques, the motor drive device cannot protect the motor when a problem occurs in the overcurrent detection circuit and the inverter control device.

The present invention has been made in view of the above, and an object of the present invention is to provide a motor drive device that protects a motor even when a problem occurs in an overcurrent detection circuit and an inverter control device.

Solution to Problem

In order to solve the above problem and achieve the object, a motor drive device according to the present invention includes: an inverter circuit to drive a motor; an inverter control device to control the inverter circuit; a gate-driving power supply to supply power to be used for driving the inverter circuit; a circuit pattern configured to connect the inverter circuit and the gate-driving power supply; a control power supply connected to the circuit pattern to supply power to be used for driving the inverter control device; and a thermal switch connected to the circuit pattern to interrupt power supply from the gate-driving power supply to the inverter circuit when a temperature of a winding of the motor exceeds a predetermined temperature.

Advantageous Effects of Invention

The motor drive device according to the present invention has an effect where it is possible to protect a motor even when a problem occurs in an overcurrent detection circuit and an inverter control device.

DESCRIPTION OF EMBODIMENTS

A motor drive device according to embodiments of the present invention will be described in detail below with reference to the accompanying drawings. The present invention is not limited to the embodiments.

First Embodiment

Figure 1:
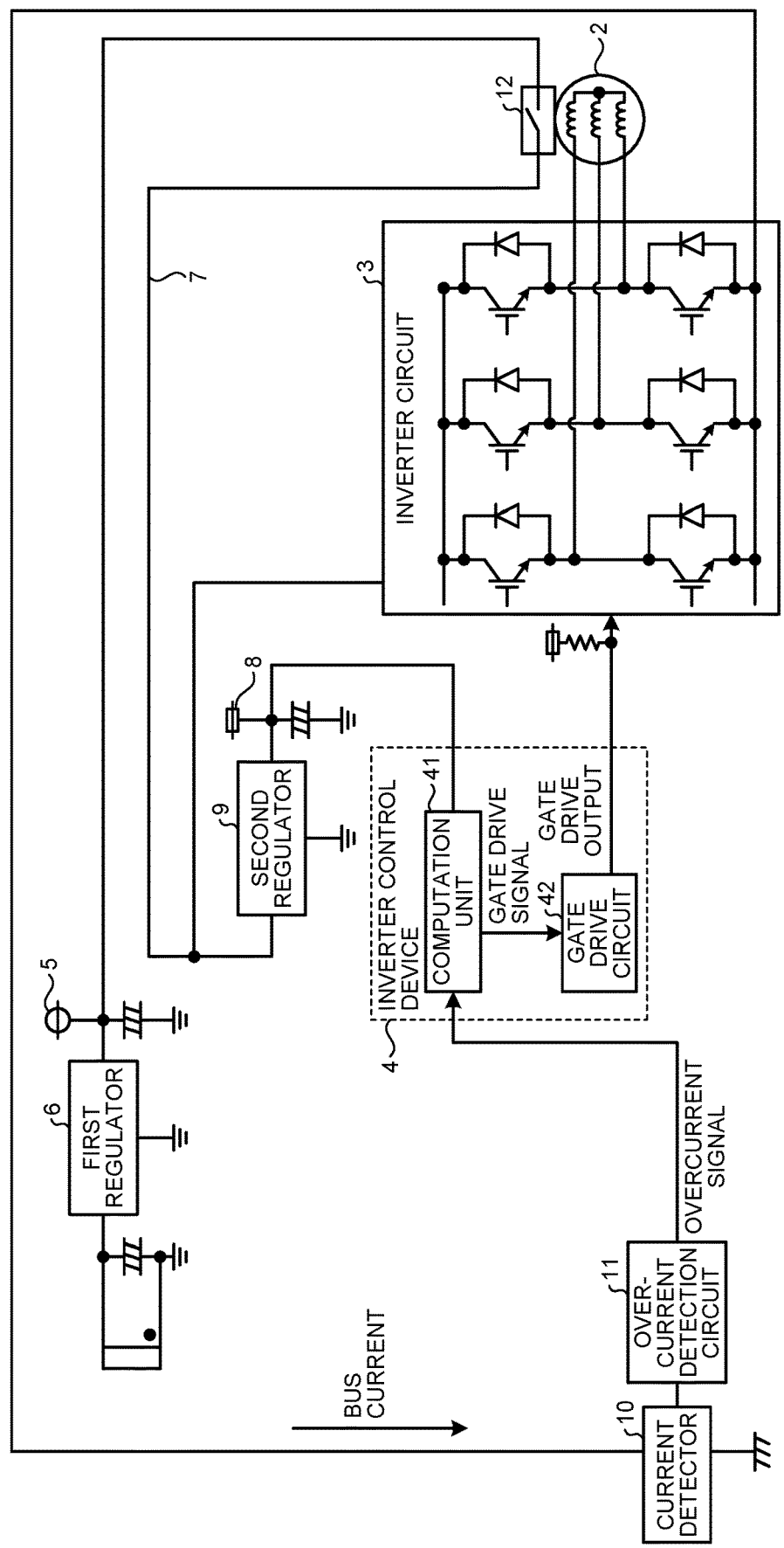
FIG. 1 is a diagram illustrating a configuration of a motor drive device according to a first embodiment.

First, the configuration of a motor drive device 1 according to a first embodiment is described. FIG. 1 is a diagram illustrating the configuration of the motor drive device 1 according to the first embodiment. The motor drive device 1 includes a motor 2 and an inverter circuit 3 to drive the motor 2. The inverter circuit 3 is configured by, for example, a plurality of semiconductor elements.

Examples of the semiconductor elements include an insulated-gate bipolar transistor and a metal-oxide silicon field-effect transmitter. The inverter circuit 3 has a function of converting a direct current (DC) voltage to any alternating current (AC) voltage, and supplies the AC voltage to the motor 2.

The motor drive device 1 further includes an inverter control device 4 to control the inverter circuit 3. The inverter control device 4 includes a computation unit 41 to perform computation to obtain a gate drive signal for controlling the inverter circuit 3, and a gate drive circuit 42 to supply a gate drive output to the inverter circuit 3. The gate drive output is based on the gate drive signal obtained by the computation unit 41. The gate drive output is a signal for controlling the inverter circuit 3.

The motor drive device 1 further includes a gate-driving power supply 5 to supply power to be used for driving the inverter circuit 3, a first regulator 6 connected to the gate-driving power supply 5, and a circuit pattern 7 configured to connect the inverter circuit 3 and the gate-driving power supply 5. In the first embodiment, the gate-driving power supply 5 supplies power to be used for driving gates of the semiconductor elements in the inverter circuit 3. The motor drive device 1 further includes a control power supply 8 connected to the circuit pattern 7 to supply power to be used for driving the inverter control device 4, and a second regulator 9 connected to the control power supply 8.

The motor drive device 1 further includes a current detector 10 to detect a bus current of the inverter circuit 3.

For example, the current detector 10 is a DC current transformer or a device including a shunt resistance. The motor drive device 1 further includes an overcurrent detection circuit 11 having a function of detecting an overcurrent in the bus current described above to output an overcurrent signal, indicating that an overcurrent is detected, to the inverter control device 4 when the overcurrent detection circuit 11 detects the overcurrent.

The motor drive device 1 further includes a thermal switch 12 connected to the circuit pattern 7 to detect a temperature of the winding of the motor 2, and interrupt power supply from the gate-driving power supply 5 to the inverter circuit 3 when the temperature of the winding of the motor 2 increases and exceeds a predetermined temperature. The thermal switch 12 is attached to the motor 2. The predetermined temperature is a temperature at which an anomaly does not occur in the motor 2, and is determined by, for example, experiment. The motor drive device 1 further includes a rectifying circuit to rectify an AC voltage to a DC voltage, and a smoothing capacitor to smooth the rectified DC voltage, although these constituent elements are not illustrated in FIG. 1.

Next, operation of the motor drive device 1 according to the first embodiment is described. For example, when the motor 2 is locked, an overcurrent flows through the inverter circuit 3, and also flows through the winding of the motor 2. Assuming that the overcurrent detection circuit 11 and the inverter control device 4 operate properly, the overcurrent detection circuit 11 detects the overcurrent that flows through the current detector 10, and outputs an overcurrent signal, indicating that the overcurrent flows through the current detector 10, to the inverter control device 4. The inverter control device 4 stops supply of a gate drive output on the basis of the overcurrent signal.

In a case where the overcurrent detection circuit 11 or the inverter control device 4 does not operate properly due to, for example, a fault, assuming that the thermal switch 12 is not provided, the inverter control device 4 does not stop supply of the gate drive output. In that case, there is a possibility that an overcurrent may continuously flow through the winding of the motor 2, and the temperature of the winding may increase to a temperature at which an anomaly can occur in the motor 2. In the first embodiment, the motor drive device 1 includes the thermal switch 12. When the temperature of the winding of the motor 2 exceeds a predetermined temperature, the thermal switch 12 is turned to an off-state and interrupts power supply from the gate-driving power supply 5 to the inverter circuit 3. As described above, the predetermined temperature is a temperature at which an anomaly does not occur in the motor 2.

The thermal switch 12 is connected to the circuit pattern 7. The circuit pattern 7 is a circuit configured to connect the inverter circuit 3 and the gate-driving power supply 5. The control power supply 8 is connected to the circuit pattern 7. Due to this configuration, when the thermal switch 12 is turned to an off-state, power supply from the gate-driving power supply 5 to the inverter circuit 3 is stopped, and power supply from the control power supply 8 to the inverter control device 4 is stopped. As a result of this, operation of the inverter circuit 3 and the inverter control device 4 stops. This stops a current from passing through the winding of the motor 2, and thus the temperature of the winding of the motor 2 is prevented from increasing to a temperature at which an anomaly can occur in the motor 2. Accordingly, the motor 2 is prevented from being damaged.

As described above, the motor drive device 1 according to the first embodiment includes the circuit pattern 7 configured to connect the inverter circuit 3 that drives the motor 2 to the gate-driving power supply 5 that supplies power to be used for driving the inverter circuit 3. The control power supply 8 that supplies power to be used for driving the inverter control device 4 that controls the inverter circuit 3 is connected to the circuit pattern 7. The motor drive device 1 further includes the thermal switch 12 connected to the circuit pattern 7.

When the temperature of the winding of the motor 2 exceeds a predetermined temperature, the thermal switch 12 interrupts power supply from the gate-driving power supply 5 to the inverter circuit 3. That is, when the temperature of the winding of the motor 2 exceeds a predetermined temperature, the thermal switch 12 is turned to an off-state. When the thermal switch 12 is turned to an off-state, operation of the inverter circuit 3 and the inverter control device 4 stops. This stops a current from passing through the winding of the motor 2, and thus the temperature of the winding of the motor 2 is prevented from increasing to a temperature at which an anomaly can occur in the motor 2. Accordingly, the motor 2 is prevented from being damaged. That is, the motor drive device 1 according to the first embodiment can protect the motor 2 even when a problem occurs in the overcurrent detection circuit 11 and the inverter control device 4.

Second Embodiment

Figure 2:
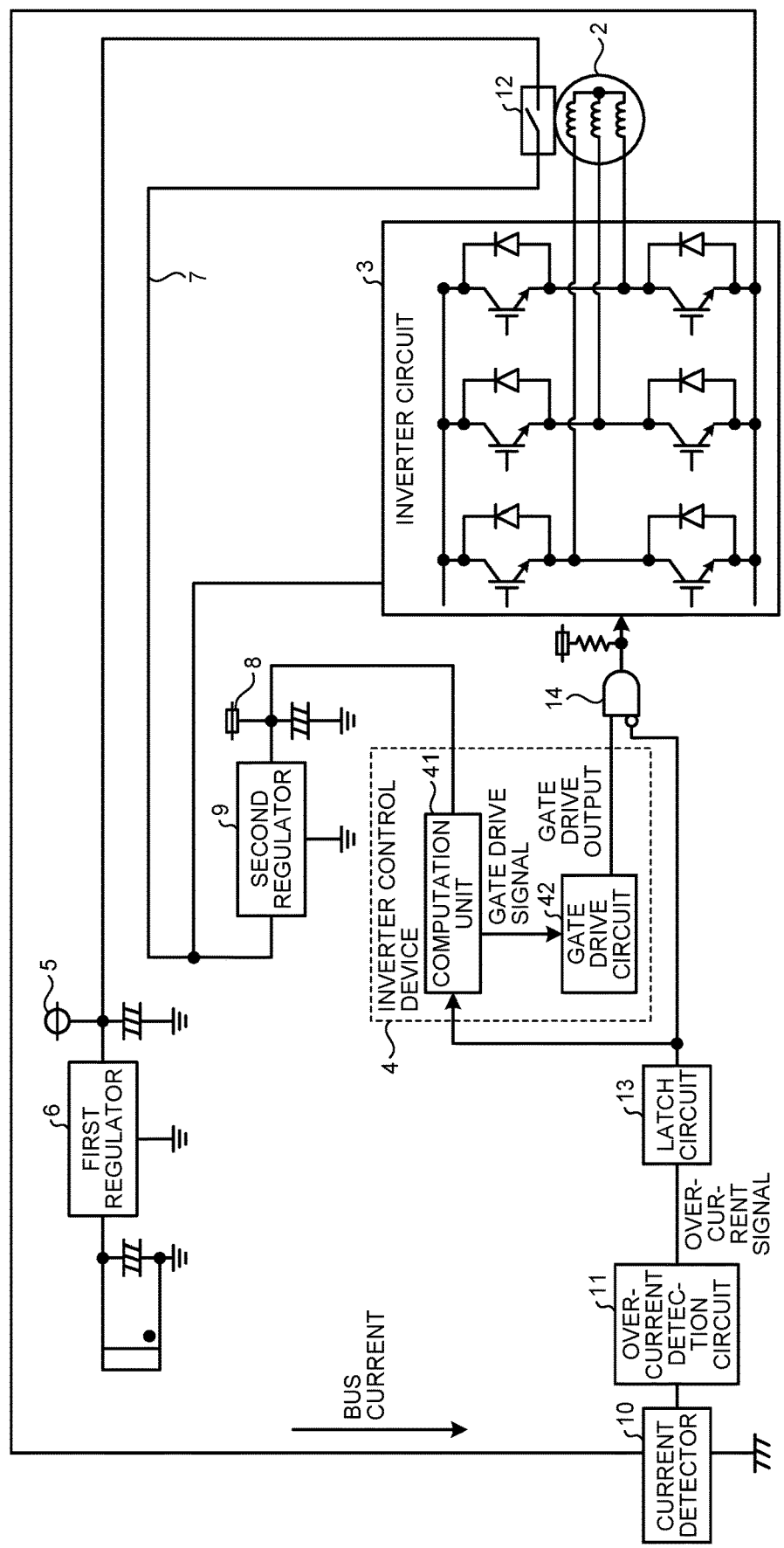
FIG. 2 is a diagram illustrating a configuration of a motor drive device according to a second embodiment.

First, the configuration of a motor drive device 1A according to a second embodiment is described. FIG. 2 is a diagram illustrating the configuration of the motor drive device 1A according to the second embodiment. The motor drive device 1A includes all the constituent elements of the motor drive device 1 according to the first embodiment, and additionally includes constituent elements that are not included in the motor drive device 1. In the second embodiment, differences from the first embodiment are mainly described.

The motor drive device 1A further includes a latch circuit 13 having a function of holding therein an overcurrent signal output from the overcurrent detection circuit 11. It is allowable that a part of the latch circuit 13 is a memory. For example, the memory is a semiconductor memory.

The motor drive device 1A further includes a buffer circuit 14 to receive a gate drive output provided from the inverter control device 4, and to stop supply of the gate drive output provided from the inverter control device 4 to the inverter circuit 3 when the latch circuit 13 holds therein an overcurrent signal. More specifically, when the latch circuit 13 holds therein an overcurrent signal, the latch circuit 13 outputs the overcurrent signal to the buffer circuit 14. When the latch circuit 13 holds therein an overcurrent signal, the buffer circuit 14 receives the overcurrent signal output from the latch circuit 13, and does not provide a gate drive output received from the inverter control device 4 to the inverter circuit 3.

It is allowable that when the overcurrent detection circuit 11 does not detect an overcurrent, the overcurrent detection circuit 11 outputs a normal-current signal indicating that an overcurrent is not detected.

Next, operation of the motor drive device 1A according to the second embodiment is described. For example, when the motor 2 is locked, an overcurrent flows through the inverter circuit 3. When an overcurrent flows through the inverter circuit 3, the overcurrent also flows through the winding of the motor 2. Assuming that the inverter control device 4 operates properly, the inverter control device 4 stops providing a gate drive output.

In a case where the inverter control device 4 does not operate properly due to, for example, a fault, assuming that the buffer circuit 14 is not provided, a gate drive output provided from the inverter control device 4 is supplied to the inverter circuit 3. In that case, there is a possibility that an overcurrent may continuously flow through the winding of the motor 2, and the temperature of the winding may increase to a temperature at which an anomaly can occur in the motor 2. In the second embodiment, the motor drive device 1A includes the latch circuit 13 and the buffer circuit 14.

The latch circuit 13 holds therein an overcurrent signal output from the overcurrent detection circuit 11. The overcurrent signal indicates that an overcurrent is detected, and is output to the inverter control device 4 when the overcurrent detection circuit 11 detects an overcurrent. When the latch circuit 13 holds therein the overcurrent signal, the buffer circuit 14 stops supply of the gate drive output provided from the inverter control device 4 to the inverter circuit 3. This causes the inverter circuit 3 to stop operation, and stops a current from passing through the winding of the motor 2. Thus, the temperature of the winding of the motor 2 is prevented from increasing to a temperature at which an anomaly can occur in the motor 2. Accordingly, the motor 2 is prevented from being damaged.

It is allowable that when the overcurrent detection circuit 11 does not detect an overcurrent, the overcurrent detection circuit 11 outputs a normal-current signal indicating that an overcurrent is not detected. In that case, the latch circuit 13 holds therein the normal-current signal outputs from the overcurrent detection circuit 11, and outputs this normal-current signal to the buffer circuit 14. When the latch circuit 13 holds therein the normal-current signal, the buffer circuit 14 receives the normal-current signal output from the latch circuit 13, and supplies a gate drive output received from the inverter control device 4 to the inverter circuit 3. That is, when the latch circuit 13 holds therein the normal-current signal, the buffer circuit 14 supplies the gate drive output provided from the inverter control device 4 to the inverter circuit 3.

As described above, the motor drive device 1A according to the second embodiment includes the buffer circuit 14 to stop supply of a gate drive output provided from the inverter control device 4 to the inverter circuit 3 when the overcurrent detection circuit 11 detects an overcurrent in a bus current of the inverter circuit 3 and outputs an overcurrent signal. When the gate drive output stops being supplied to the inverter circuit 3, operation of the inverter circuit 3 stops. This stops a current from passing through the winding of the motor 2, and thus the temperature of the winding of the motor 2 is prevented from increasing to a temperature at which an anomaly can occur in the motor 2. Accordingly, the motor 2 is prevented from being damaged. That is, the motor drive device 1A according to the second embodiment can protect the motor 2 even when a problem occurs in the inverter control device 4.

Figure 3:
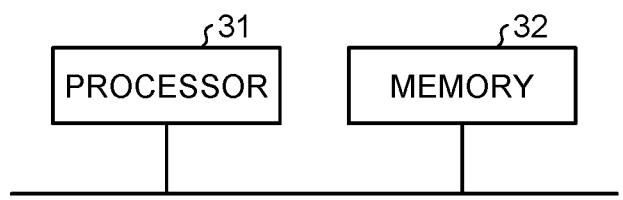
FIG. 3 is a diagram illustrating a processor in a case where at least some of the functions of an inverter control device included in the motor drive device according to the first embodiment are implemented by a processor.

FIG. 3 is a diagram illustrating a processor 31 in a case where at least some of the functions of the inverter control device 4 included in the motor drive device 1 according to the first embodiment are implemented by the processor 31. That is, at least some of the functions of the inverter control device 4 may be implemented by the processor 31 that executes a program stored in a memory 32. The processor 31 may be a device such as a Central Processing Unit (CPU), a processing device, an arithmetic device, a microprocessor, or a Digital Signal Processor (DSP). The memory 32 is also illustrated in FIG. 3.

In a case where at least some of the functions of the inverter control device 4 are implemented by the processor 31, some of the functions are implemented by the processor 31 and software, firmware, or a combination of software and firmware. The software or the firmware is described as a program and stored in the memory 32. The processor 31 reads and executes the program stored in the memory 32 to thereby implement at least some of the functions of the invertor control device 4.

In a case where at least some of the functions of the inverter control device 4 are implemented by the processor 31, the motor drive device 1 includes the memory 32 that stores therein programs that result in the execution of at least some of steps to be performed by the invertor control device 4. The programs stored in the memory 32 are also regarded as programs causing a computer to execute at least some of the procedures or methods performed by the invertor control device 4.

The memory 32 is, for example, a non-volatile or volatile semiconductor memory such as a random access memory (RAM), a read only memory (ROM), a flash memory, an erasable programmable read only memory (EPROM), or an electrically erasable programmable read only memory (EE-PROM (registered trademark)); a magnetic disk; a flexible disk; an optical disk; a compact disc; a mini disc; a digital versatile disk (DVD); or the like.

Figure 4:
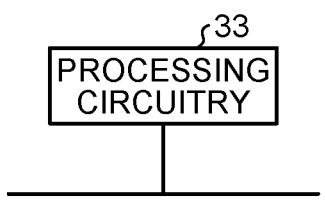
FIG. 4 is a diagram illustrating a processing circuitry in a case where at least a part of the inverter control device included in the motor drive device according to the first embodiment is implemented by the processing circuitry.

FIG. 4 is a diagram illustrating a processing circuitry 33 in a case where at least a part of the inverter control device 4 included in the motor drive device 1 according to the first embodiment is implemented by the processing circuitry 33. That is, it is allowable that at least a part of the inverter control device 4 is implemented by the processing circuitry 33.

The processing circuitry 33 is dedicated hardware. For example, a single circuit, a combined circuit, a programmed processor, a parallel-programmed processor, an Application Specific Integrated Circuit (ASIC), an Field Programmable Gate Array (FPGA), or a combination thereof corresponds to the processing circuitry 33.

While the inverter control device 4 has a plurality of functions, it is allowable that some of the functions are implemented in software or firmware and the other functions are implemented in dedicated hardware. In this manner, the functions of the inverter control device 4 can be implemented in hardware, software, firmware, or a combination thereof.

It is allowable that at least some of the functions of the latch circuit 13 and the buffer circuit 14, included in the motor drive device 1A according to the second embodiment, are implemented by a processor that executes programs stored in a memory. The memory stores therein programs that result in the execution of at least some of steps to be performed by the latch circuit 13 and the buffer circuit 14. The latch circuit 13 and the buffer circuit 14 may be at least partially implemented by a processing circuitry. The processing circuitry is similar to the processing circuitry 33.

The configurations described in the above embodiments are only examples of the content of the present invention. The configurations can be combined with other well-known techniques, and part of each of the configurations can be omitted or modified without departing from the gist of the present invention.

REFERENCE SIGNS LIST 1, 1A motor drive device, 2 motor, 3 inverter circuit, 4 inverter control device, 5 gate-driving power supply, 6 first regulator, 7 circuit pattern, 8 control power supply, 9 second regulator, 10 current detector, 11 overcurrent detection circuit, 12 thermal switch, 13 latch circuit, 14 buffer circuit, 31 processor, 32 memory, 33 processing circuitry, 41 computation unit, 42 gate drive circuit.

The invention claimed is:

1. A motor drive device comprising:
   an inverter circuit to drive a motor;
   an inverter control device to control the inverter circuit;
   a gate-driving power supply to supply power to be used for driving the inverter circuit;
   a circuit pattern configured to connect the inverter circuit and the gate-driving power supply;
   a control power supply connected to the circuit pattern to supply power to be used for driving the inverter control device; and
   a thermal switch connected to the circuit pattern to interrupt power supply from the gate-driving power supply to the inverter circuit when a temperature of a winding of the motor exceeds a predetermined temperature,
   wherein
   the thermal switch is connected to the circuit pattern between the gate-driving power supply and the inverter circuit,
   the inverter control device provides a gate drive output for controlling the inverter circuit, and
   the motor drive device further comprises:
      an overcurrent detection circuit having a function of detecting an overcurrent in a bus current of the inverter circuit to output an overcurrent signal indicating that the overcurrent is detected when the overcurrent detection circuit detects the overcurrent;
      a latch circuit having a function of holding therein the overcurrent signal output from the overcurrent detection circuit; and
      a buffer circuit to receive the gate drive output provided from the inverter control device, and to stop supply of the gate drive output provided from the inverter control device to the inverter circuit when the latch circuit holds therein the overcurrent signal.

2. The motor drive device according to claim 1, wherein the thermal switch is attached to the motor.

\* \* \* \* \*